United States Patent Office 3,412,614
Patented Nov. 26, 1968

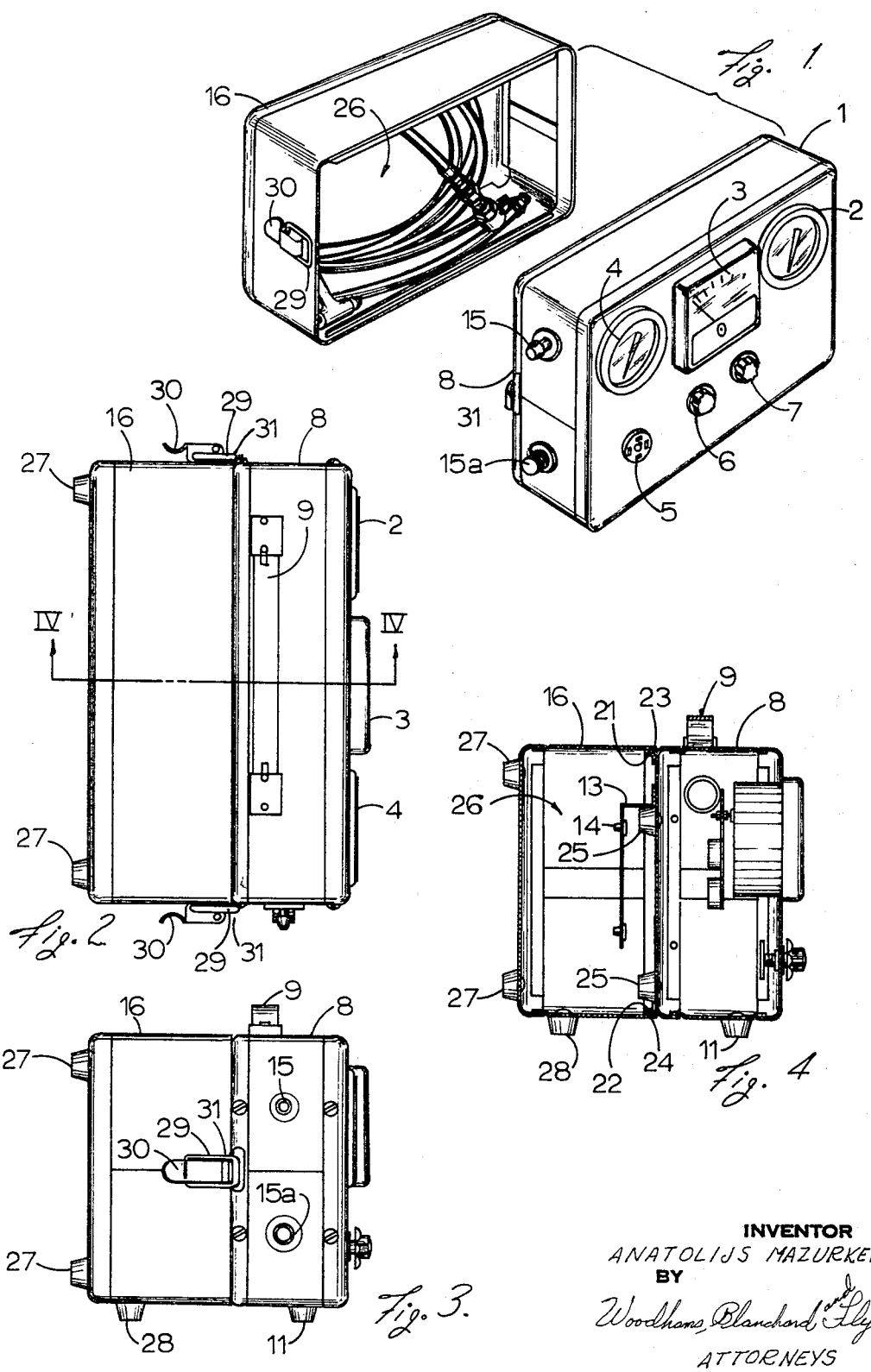

3,412,614
TWO-PART HOUSING FOR TEST UNIT
Anatolijs Mazurkevics, Kalamazoo, Mich., assignor to Allen Electric and Equipment Company, Kalamazoo, Mich., a corporation of Michigan
Filed Sept. 1, 1966, Ser. No. 576,614
5 Claims. (Cl. 73—431)

ABSTRACT OF THE DISCLOSURE

An assembly for housing and carrying an automotive test unit and accessory equipment therefor having a two part housing in which one part is for storing the accessory equipment and the other part contains the test equipment and indicators.

---

This invention relates to a housing and carrying assembly for an automotive test unit and, more particularly, to a two-part package having one part for carrying accessory equipment and another part containing the test unit and the indicators thereof.

The objects of the invention are:

(1) To provide a housing and carrying assembly for automotive test equipment which will carry both the test unit and the accessory equipment in a convenient, compact and readily portable package.

(2) To provide an assembly, as aforesaid, in which the test equipment and the indicators therefor are disposed within one self-contained part and in which accessory apparatus is receivable in a second part and the two parts can be readily joined together for transportation or separated for use.

(3) To provide an assembly, as aforesaid, in which, when the parts are separated, the part carrying the test unit is completely independent of the part carrying the accessory equipment.

(4) To provide an assembly, as aforesaid, which is extremely simple in construction and is easy to handle regardless of whether the part containing the test unit is handled separately or in conjunction with the part carrying the auxiliary equipment.

(5) To provide an assembly, as aforesaid, in which the part containing the test unit, when separated from the part carrying the auxiliary equipment, can be readily mounted on wall means, such as by being hung on the window of the automobile undergoing a test.

(6) To provide an assembly, as aforesaid, in which the part containing the test unit can be placed in association with the part provided for carrying the auxiliary equipment, if desired, to provide greater stability and a broader supporting base when said test unit is being used.

Other objects and purposes of the invention will be apparent to persons acquainted with apparatus of the general type upon reading the following disclosure and inspecting the accompanying drawings.

In the drawings:

FIGURE 1 is an oblique, exploded view of both units of the assembly.

FIGURE 2 is a top plan view of the parts connected together for carrying same.

FIGURE 3 is a side elevational view of the parts connected together for carrying same.

FIGURE 4 is a central sectional view taken along the line IV—IV but indicating the testing apparatus itself only schematically.

In meeting the objects and purposes of the invention as above set forth, there is provided an assembly comprising a test unit part 1 containing any desired testing instruments and having mounted on the front wall thereof suitable indicators 2, 3 and 4 associated with said testing instruments. In the particular embodiment here utilized for illustrative purposes, said testing instruments consist of a vacuum indicator 2, a tachometer 3 and a pressure sensing indicator 4. Other control means of conventional sort are provided by the control knobs 6 and 7. In the illustrated embodiment, knob 6 controls the speed range setting of the tachometer 3 and knob 7 is used for adjusting the tachometer depending on the number of cylinders of the engine in the vehicle being tested. A socket 5 also is provided whereby the tachometer can be connected to respond to the speed of the engine in the vehicle being tested. These components are arranged in a generally rectangular closed box 8 having a carrying handle 9 on its top and supporting feet, of which one appears at 11, on its bottom. A hook 13 of generally inverted L-shaped form is fastened to the back or rear wall of the box 8 and projects away therefrom and is preferably provided with antimar means such as grommets, of which one is indicated at 14. The box has fittings 15 and 15a whereby conduits connected to the device being tested can be connected thereto and said fittings are connected to the indicators 2 and 4 so that said indicators respond to conditions in the device being tested.

The carrying assembly further consists of an accessory equipment part 16 which is of rectangular shape and is open on one side thereof to permit entry of the part 1 thereinto. Thus, the rearward surface of box 8 has rounded edges so that it extends slightly into the open side of the part 16 and the remainder of the sides of the box 8 are substantially flush with the sides of the part 16. Internal flanges 21 and 22 are fastened by any convenient means, such as by welding, to opposing internal surfaces 23 and 24 of the part 16 and these flanges cooperate with bumpers 25 on the rearward surface of the box 8 properly to locate said box 8 with respect to the part 16.

Sufficient space exists between flanges 21 and 22 and the base wall of the part 16 to provide, when the box 8 is assembled into the part 16, a storage zone 26 immediately next to the rearward surface of said box 8. Pads 27 are provided on the base wall of the part 16 for laying same on a supporting surface on its back. Also, the part 16 is provided with supporting feet 28 which cooperate with the feet 11 on the box 8 for placement of the assembly on a surface when same are fastened together as a unit.

Any kind of convenient releasable fastening device where a pair of loops of which one is indicated at 29, hingedly connected to a lever 30 on the part 16 and engageable with a hook 31 on the box 8, are provided for fastening the box 8 and part 16 together as needed or, by releasing said loops, make readily separable for the more convenient use of the box 8 as needed by the circumstances of the particular use involved.

In use, accessory equipment such as power connections, hose connections and similar will be disposed within the part 16 which is then closed by the placement thereon of the test unit 1. The fastening devices are then set and the assembly becomes a single unit for convenient transportation with no danger of losing the accessory equipment. In use, the fastening devices are released, whatever accessory equipment needed is removed and placed as required on the test unit 1. The test unit 1 may then be restored onto the receptacle if it is desired to provide a broader base for same than can be provided by the test unit itself. When it is desired to use the test unit 1 under circumstances where a smaller size will be useful, such as within the automobile itself and particularly such as hanging same on the window or other available panel of the automobile under test, then the test unit 1 is kept separate from the part 16 and placed for use as needed by placing the hook over a convenient support.

Although a particular preferred embodiment of the invention has been described above in detail for illustrative purposes, it will be recognized that variations or modifications of such disclosure, which lie within the scope of the appended claims, are fully contemplated.

The embodiments of the invention in which an exclusive property or privilege is claimed are defined as follows:

1. An assembly for housing and carrying at least one testing instrument and accessory equipment therefor, comprising:

first enclosure means having first sidewalls, a first front wall and a first rear wall, said first enclosure means having said at least one testing instrument mounted thereto and hook means secured thereto;

second enclosure means having a cross sectional size equal to the cross sectional size of said first enclosure means, said second enclosure means having second sidewalls, a second rear wall and a second front wall, said second front wall including means defining an opening into the interior of said second enclosure means, said second front wall releasably engaging said first rear wall, said first rear wall being spaced from said second rear wall to define a storage zone into which said accessory equipment is received;

fastening means releasably securing said first rear wall to second front wall; and support means supporting said first and second enclosure means when said enclosure means are connected together by said fastening means whereby when said enclosure means are separated by a releasing of said fastening means, said hook means will serve to support said first enclosure means.

2. The assembly defined in claim 1, including a plurality of pressure fluid fittings secured to at least one of said walls of said first enclosure means and fluid pressure responsive indicators mounted on said first front wall.

3. An assembly according to claim 1, including a tachometer mounted on said first front wall of said first enclosure means and a socket mounted on at least one of said walls of said first enclosure means, said tachometer connected to said socket whereby said tachometer can be connected to a device undergoing test by a connection to said socket.

4. An assembly according to claim 1, in which said support means includes cooperating legs on the corresponding side walls of said first and second enclosure means.

5. An assembly according to claim 4, including third support means mounted on the exterior surface of said second rear wall.

References Cited
UNITED STATES PATENTS

| | | | |
|---|---|---|---|
| 2,033,491 | 3/1936 | Sprague et al. | 73—431 X |
| 2,073,243 | 3/1937 | Liddell et al. | 73—118 X |
| 2,855,257 | 10/1958 | Barker et al. | 73—431 X |
| 2,924,495 | 2/1960 | Haines | 73—431 X |
| 2,966,257 | 12/1960 | Littlejohn. | |
| 3,238,771 | 3/1966 | Myrtetus et al. | 73—117 |

RICHARD C. QUEISSER, *Primary Examiner.*

JERRY W. MYRACLE, *Assistant Examiner.*